United States Patent [19]
Bosko

[11] Patent Number: 5,927,099
[45] Date of Patent: Jul. 27, 1999

[54] RECIRCULATING WATER PURIFICATION SYSTEM

[75] Inventor: Robert S. Bosko, Fountain Valley, Calif.

[73] Assignee: Edward E. Chavez, Anaheim, Calif.

[21] Appl. No.: 08/820,018

[22] Filed: Mar. 18, 1997

[51] Int. Cl.[6] .................................................. F25C 1/12
[52] U.S. Cl. ............................................................ 62/348
[58] Field of Search ............................... 62/348, 347, 352

[56] References Cited

U.S. PATENT DOCUMENTS

| | | | |
|---|---|---|---|
| 2,821,070 | 1/1958 | Watt et al. ................................ | 62/348 |
| 2,921,447 | 1/1960 | Gottschalk ................................ | 62/348 |
| 2,997,861 | 8/1961 | Kocher et al. ........................... | 62/348 |
| 3,812,686 | 5/1974 | Tester ....................................... | 62/348 |
| 5,256,279 | 10/1993 | Voznick et al. ........................ | 210/86 |
| 5,527,470 | 6/1996 | Suda ........................................ | 62/348 |

*Primary Examiner*—William E. Tapolcai
*Attorney, Agent, or Firm*—Harry G. Weissenberger

[57] ABSTRACT

Energy and water consumption of a commercial icemaker are greatly reduced by capturing the excess water running off the freezer plates and mixing it with new water to provide a pre-chilled water supply to the freezer plates. The resulting decrease in water demand makes practical the filtration of the new water by reverse osmosis to keep the recirculating water free of pathogens, and to reduce maintenance of the freezer plates by largely eliminating dissolved mineral contaminants from the new water.

10 Claims, 2 Drawing Sheets

RECIRCULATING WATER PURIFICATION SYSTEM

FIELD OF THE INVENTION

This invention relates to recirculating reverse osmosis purification systems for machinery using a high volume of water, and more particularly to an energy-saving, high purity water supply system for icemaking machines.

BACKGROUND OF THE INVENTION

Commercial icemakers, such as those in common use in restaurants, hotels and the like require a substantial amount of water and electrical energy in order to produce ice at the rates required by a commercial establishment. At the same time, sanitary considerations with respect to ice intended for human consumption on the one hand, and maintenance considerations on the other hand, require that the water used in ice machines be free of pathogens as well as being free of mineral contaminants. The latter tend to accumulate on the freezer plates and need to be removed at frequent intervals to maintain the efficiency of the machine.

Because icemakers make ice by spraying water onto electrically chilled freezer plates, a substantial amount of water is lost during each freezing cycle by failing to freeze before reaching the bottom of the freezer plates and exiting into the drain; yet a considerable amount of energy is expended in lowering the temperature of this lost water as well as of the water that does freeze.

Regarding the filtration and purification of the water used for icemaking, it is ideally done by reverse osmosis because that is the most thorough practical method of purification. Unfortunately, the reverse osmosis process is relatively slow and does not lend itself well to applications in which large quantities of water need to be purified in a relatively short time.

SUMMARY OF THE INVENTION

The present invention makes reverse osmosis purification practical for commercial icemakers, while at the same time substantially reducing their energy consumption and increasing their yield. It does so by recirculating and reusing the highly purified and cooled overflow water from the freezing plates in a closed circuit in which only the water actually frozen into ice cubes is replenished through a reverse osmosis membrane.

DESCRIPTION OF THE PREFERRED EMBODIMENT

Figure 1:
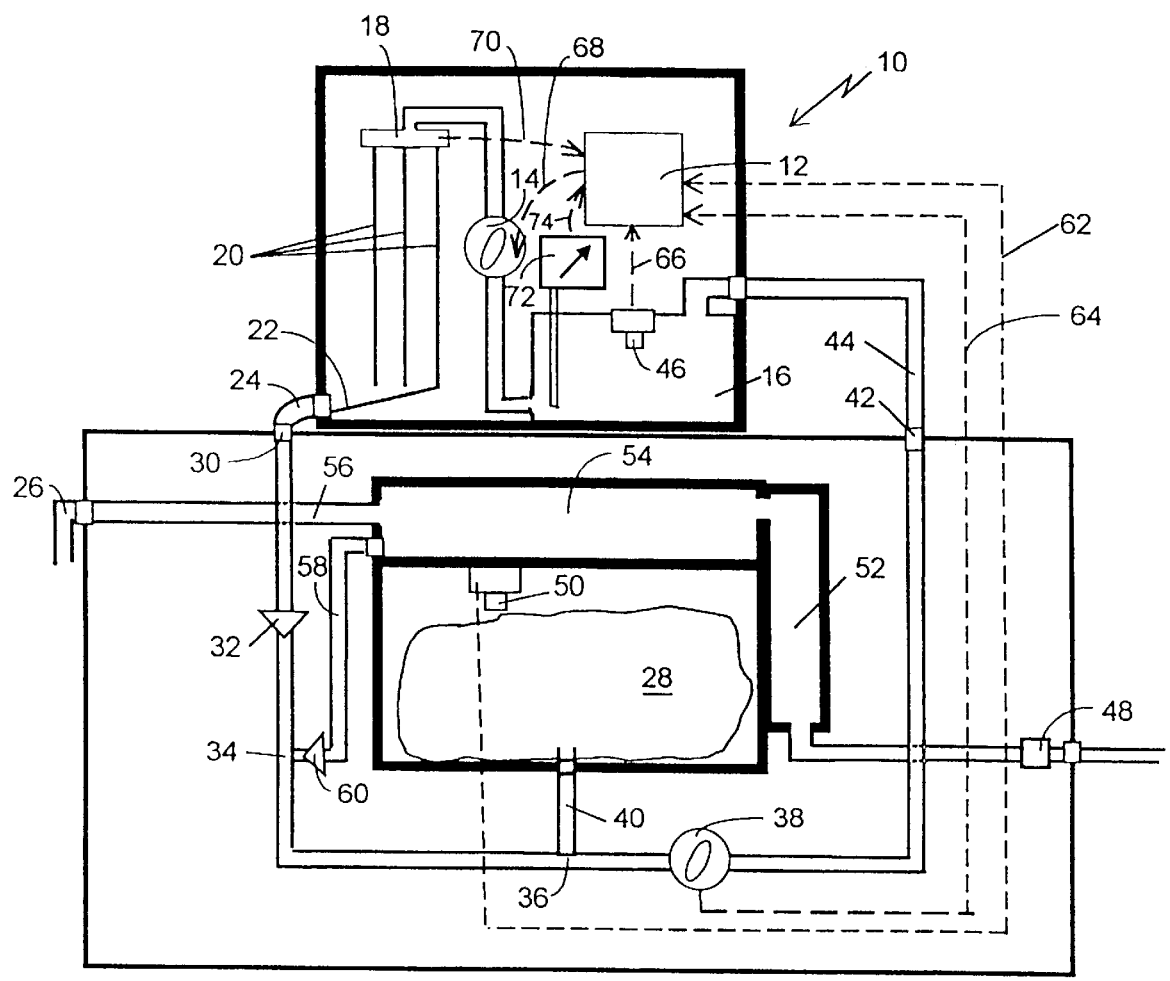
FIG. 1 is a schematic view of an icemaker using the invention.

FIG. 1 illustrates the system of this invention as applied to an icemaking machine 10. Under the control of a controller 12, the sump pump 14 draws water from the sump 16 and conveys it to the freezer plate manifold 18 which provides refrigerant (not shown) to the freezer plates 20 and sprays water onto them. Excess water that has not frozen while in contact with the freezer plates 20 drops onto the drain board 22 and flows into the freezer drain conduit 24.

Figure 2:
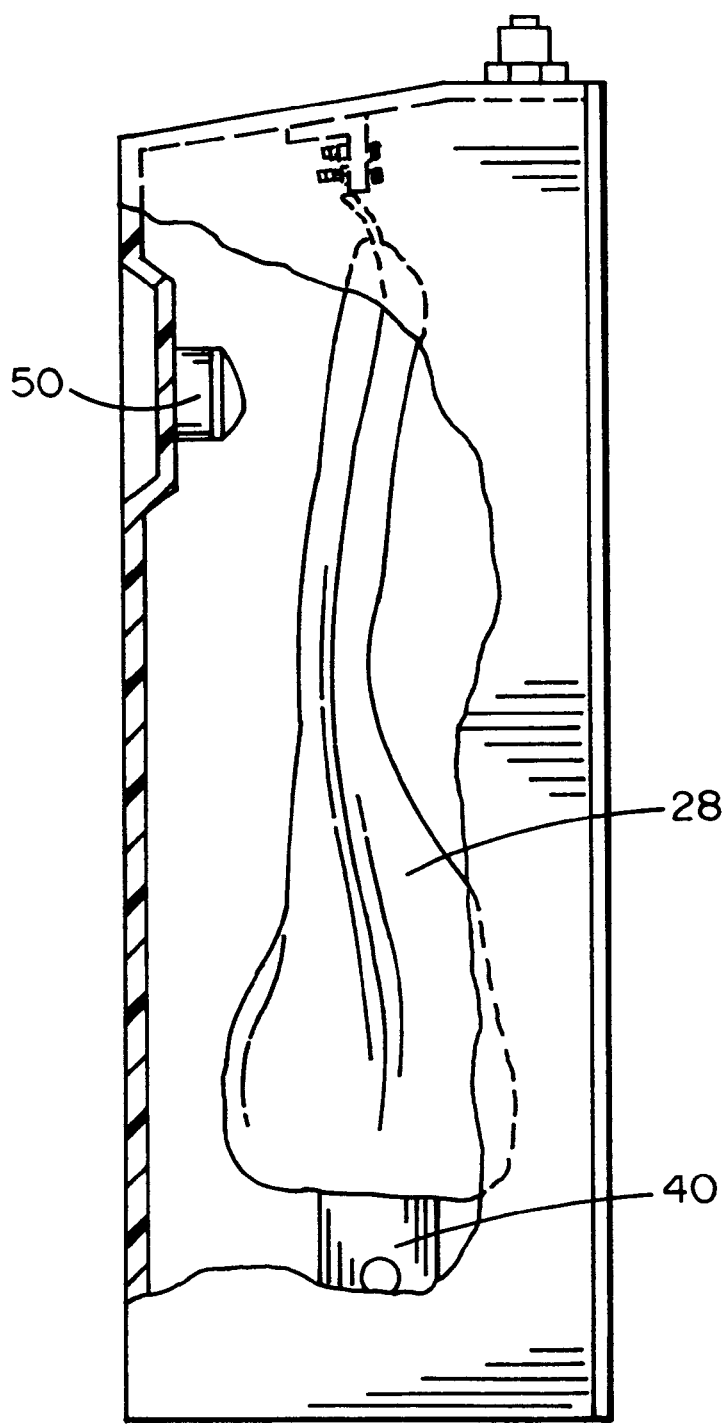
FIG. 2 is a detail schematic view of the water storage bag and its connections.

The icemaker 10 is physically located on top of or above a cabinet 26 which houses a flexible, expandable storage bag 28. The storage bag 28 may advantageously be of the type described in U.S. Pat. No. 5,256,279 issued on Oct. 26, 1993 to Voznick et al. The freezer drain conduit 24 is connected at an inlet 30 to the cabinet 26. From the inlet 30, the excess freezer plate water flows by gravity through a backflow preventer valve 32 and a filtered water inlet junction 34 to the bag junction 36 at the bottom of bag 28. Water freely enters and exits the bag 28, which is sealed at the top (see FIG. 2), through its bottom so that the bag 28 will collapse and expand with varying water content, and thereby reliably operate the limit switch 50 without allowing either air or the limit switch 50 to come into contact with the water in bag 28.

When the recirculating pump 38 is stopped, the excess freezer plate water flows upwardly through conduit 40 into the storage bag 28. When the recirculating pump 38 is activated, however, the excess freezer plate water plus water from bag 28 descending through conduit 40 is pumped through connection 42 and conduit 44 into the sump 16. A limit switch 46 acting through the controller 12 shuts off the pump 38 when the sump 16 gets full.

Because the above-described water flow forms a closed circuit, the bag 28 gradually empties as the portion of the water in the circuit that has frozen into ice is removed from the circuit. To keep the bag 28 full, the city water supply is connected to the inlet fitting of an electric valve 48 which is controlled by the limit switch 50. The limit switch 50 is in turn actuated by the collapsible storage bag 28 as it fills and empties.

The city water entering through the valve 48 first preferably flows through a carbon pre-filter 52 which removes the major impurities in the city water. The pre-filtered water is then applied to a reverse osmosis (RO) filter 54 located above the bag 28. A portion of the water flowing over the RO filter 54 is discarded and exits the system through overflow drain 56. The remainder of the water in filter 54 passes through the RO membranes and becomes highly purified and free of pathogens and minerals. This water flows by gravity through line 58 and backflow-preventing check valve 60 to join the excess freezer plate water flow at junction 34.

The operation of the system of FIG. 1 is as follows: When the icemaker 10 is first turned on, the RO filter 54 first fills the bag 28. When the bag 28 is full, the initial closing of limit switch 50 enables controller 12 (dotted line 62). The controller 12 now energizes the pump 38 (dotted line 64) and the sump 16 fills until limit switch 46 causes the controller 12 (dotted line 66) to turn pump 38 off.

The controller 12 now turns on pump 14 (dotted line 68) and the freezer plate refrigeration system (not shown), and the manifold 18 sprays the water pumped by pump 14 onto the frezer plates 20. Some of that water freezes on the plates 20, and the rest falls on plate 22 and runs off through line 24. During this time, the controller 12 keeps the pump 38 going enough to keep sump 16 filled.

Because the pumps 38 and 14 move the same amount of water per unit time (as long as the water level in sump 16 remains substantially constant), and because some of the water pumped by pump 14 is captured as ice on the plates 20, it will be apparent that some of the water pumped by pump 38 must be drawn from the bag 28. When the RO filter 54 is operating, however, the sum of the flow in lines 24 and 58 is greater than the flow drawn by pump 38, and the bag 28 refills. Because the RO filter operation is controlled through valve 48 by limit switch 50, the RO filter operates just enough to replace the water frozen on the plates 20 and keeps the bag 28 full.

When the ice on plates 20 is ready to harvest, the controller opens a conventional ice chute (not shown) and momentarily heats the plates 20 to cause the ice cubes that have formed on the plates 20 to drop into an ice bin (not shown). The harvest can be triggered in several ways: conventionally, a weight sensor or a build-up sensor on the freezer plate assembly may triggr the controller 12 (dotted line 70); or, in the system of this invention, a sump thermometer 72 may trigger the controller 12 (dotted line 74) when the water temperature in sump 16 drops below an empirically determined threshold.

It will be appreciated that the excess freezer plate water draining into conduit 24 is very cold. Because the water entering the bag 28 and pump 38 when the RO filter 54 is operating is a mixture of RO-filtered water and excess freezer plate water, the temperature of the bag 28 and of the sump 16 decreases rather rapidly when the system is operating. Typically, the water temperature in sump 16 may start at 10° C. and drop to 0.8° C. by the time the ice on plates 20 is ready to harvest. As a result, the first cycle of a representative icemaker may take, e.g., 15 minutes, but after just three or four cycles, the same icemaker using the system of this invention will harvest about every 7 minutes. Consequently, the refrigeration energy consumption per harvest is only about 50% of the corresponding consumption in the absence of the inventive system.

The system of this invention is even more economical in terms of water consumption. Typically, a commercial icemaker equipped with the system of this invention has been found to consume about 1 l of water per cycle as opposed to 10 l/cycle without the inventive system. Also, calcium buildup on the freezer plates 20, which is a major maintenance problem in commercial icemakers, is greatly reduced. This is due both to the fact that RO-filtered water has a hardness of about 24 as opposed to the 200–300 hardness of typical city water, and to the fact that only 1/10 as much new city water per cycle is introduced into the icemaker than would be the case without the inventive system.

It is understood that the exemplary recirculating water purification system described herein and shown in the drawings represents only a presently preferred embodiment of the invention. Indeed, various modifications and additions may be made to such embodiment without departing from the spirit and scope of the invention. Thus, other modifications and additions my be obvious to those skilled in the art and may be implemented to adapt the present invention for use in a variety of different applications.

I claim:

1. An icemaking system, comprising:
   a) a source of water containing substances undesirable in ice produced by said icemaking system;
   b) a reverse osmosis filter having an inlet connected to said substance-containing water source, and a purified water outlet arranged to put out purified water;
   c) an unpressurized reservoir connected to said reverse osmosis filter outlet so as to receive purified water therefrom;
   d) an icemaking unit including apparatus connected to receive a stream of purified water from said reservoir, said icemaking unit being arranged to freeze a portion of said purified water stream and discharge the unfrozen portion of said water stream;
   e) a conduit connected to said unit and said reservoir, and arranged to return said discharged portion of said water stream to said reservoir;
   f) pump connected to said reservoir and said icemaking unit, and arranged to convey water from said reservoir, said conduit and said reverse osmosis filter to said icemaking unit when said icemaking unit is making ice; and
   g) said pump conveys water at a rate greater than the water flow in said conduit but less than the sum of the water flow in said conduit and the flow of purified water from said reverse osmosis filter.

2. The system of claim 1, in which said unfrozen portion is discharged into said conduit at a point above said reservoir so as to flow into said reservoir by gravity.

3. The system of claim 1, in which said purified water outlet is located above said reservoir so as to cause purified water to flow into said reservoir by gravity.

4. The system of claim 1, in which said reservoir is an expandable bag.

5. The system of claim 4, in which said bag has a single port serving as both a water inlet to said bag and a water outlet from said bag.

6. The system of claim 5, in which said port is located at the bottom of said bag.

7. A recirculating system for making ice, comprising:
   a) an icemaking machine having refrigerated freezer plates, a manifold arranged to spray water over said freezer plates, a controller, a pump connected to said controller and arranged to provide a supply of water for said manifold during the freezing portion of an icemaking cycle, and a collector for collecting excess water from said freezer plates;
   b) a water source; and
   c) a storage reservoir connected to said collector and to said water source to receive water therefrom, said pump being connected to said reservoir, collector and water source, and said pump providing water to said manifold, when said icemaking machine is making ice, at a rate greater than the flow of said excess water but less than the sum of said excess water flow and the water flow from said water source.

8. The system of claim 7, in which said water source is a reverse osmosis filter.

9. The system of claim 7, in which said reservoir is a sealed, collapsible bag having an inlet and outlet at its bottom.

10. The system of claim 9, further comprising a limit switch arranged to turn off said water source when said bag expands to a predetermined size.

* * * * *